US012562582B2

(12) United States Patent
Kojima et al.

(10) Patent No.: US 12,562,582 B2
(45) Date of Patent: Feb. 24, 2026

(54) POWER SUPPLY DEVICE CHARGING POWER STORAGE DEVICE BASED ON VOLTAGE COMPARISON

(71) Applicant: TOYOTA JIDOSHA KABUSHIKI KAISHA, Toyota (JP)

(72) Inventors: Koichi Kojima, Toyota (JP); Masashi Yoshimi, Toyota (JP); Soichiro Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 18/660,235

(22) Filed: May 10, 2024

(65) Prior Publication Data

US 2025/0023368 A1 Jan. 16, 2025

(30) Foreign Application Priority Data

Jul. 11, 2023 (JP) ................................. 2023-113441

(51) Int. Cl.
*H02J 7/00* (2006.01)
*H02P 27/06* (2006.01)

(52) U.S. Cl.
CPC .......... *H02J 7/0024* (2013.01); *H02J 7/0013* (2013.01); *H02J 7/0029* (2013.01); *H02J 7/0063* (2013.01); *H02J 7/007182* (2020.01); *H02P 27/06* (2013.01)

(58) Field of Classification Search
CPC ........... H02J 7/0024; H02J 7/13; H02J 7/0029
See application file for complete search history.

(56) References Cited

U.S. PATENT DOCUMENTS

| | | | | |
|---|---|---|---|---|
| 3,654,538 A * | 4/1972 | Gardberg | .............. | H02J 7/0034 |
| | | | | 361/84 |
| 6,476,571 B1 * | 11/2002 | Sasaki | ...................... | B60K 6/26 |
| | | | | 318/245 |
| 12,240,338 B2 * | 3/2025 | Uchiyama | ............. | H02J 7/0047 |
| 2014/0191720 A1 * | 7/2014 | Sugiyama | ............. | H02J 7/1423 |
| | | | | 320/109 |
| 2019/0359081 A1 * | 11/2019 | Erhart | ...................... | B60L 1/003 |
| 2020/0023746 A1 * | 1/2020 | Kim | .................... | H02M 1/4216 |
| 2020/0185936 A1 | 6/2020 | Oishi et al. | | |
| 2020/0341061 A1 * | 10/2020 | Shin | .................... | G01R 31/3274 |
| 2021/0101494 A1 * | 4/2021 | Lee | ......................... | B60L 53/60 |
| 2021/0351684 A1 * | 11/2021 | Nishimura | ............ | H02M 3/158 |
| 2021/0359533 A1 * | 11/2021 | Hatano | .................. | H02M 3/158 |
| 2021/0405116 A1 * | 12/2021 | Lee | ........................ | H02J 7/0047 |

(Continued)

FOREIGN PATENT DOCUMENTS

| | | |
|---|---|---|
| JP | 2020-150784 A | 9/2020 |
| JP | 2022-187416 A | 12/2022 |

*Primary Examiner* — Adi Amrany
(74) *Attorney, Agent, or Firm* — SoraIP, Inc.

(57) ABSTRACT

The power supply device performs one-side charge control for controlling the system main relay, the charging relay, the series connection relay, the parallel connection relay, and the first and second neutral point relays so that only the first power storage unit is charged using the external DC power until the voltage of the first power storage unit becomes equal to or higher than the voltage of the second power storage unit before the first and second neutral point relays are turned on and the power storage device is charged using the external DC power.

2 Claims, 6 Drawing Sheets

(56) References Cited

U.S. PATENT DOCUMENTS

| | | | |
|---|---|---|---|
| 2023/0038790 A1* | 2/2023 | Ling | H01M 10/625 |
| 2025/0023367 A1* | 1/2025 | Kojima | H02J 7/345 |
| 2025/0211095 A1* | 6/2025 | Toyama | H02J 7/00 |

* cited by examiner

POWER SUPPLY DEVICE CHARGING POWER STORAGE DEVICE BASED ON VOLTAGE COMPARISON

CROSS-REFERENCE TO RELATED APPLICATION

This application claims priority to Japanese Patent Application No. 2023-113441 filed on Jul. 11, 2023, incorporated herein by reference in its entirety.

BACKGROUND

1. Technical Field

The present disclosure relates to a power supply device.

2. Description of Related Art

There has conventionally been proposed a power supply device that includes a switching unit, a first input unit, and first and second relays (see Japanese Unexamined Patent Application Publication No. 2020-150784 (JP 2020-150784 A), for example). The switching unit switches between connecting a first power storage unit (first battery) and a second power storage unit (second battery) in series and switching such power storage units in parallel. The first input unit is connected to an external charger to receive power input from the external charger. The first relay is attached to a power line that connects between a positive electrode of the first power storage unit and a positive electrode of the second power storage unit. The second relay is attached to a power line that connects between a negative electrode of the first power storage unit and a negative electrode of the second power storage unit. In this device, when there is a difference in voltage between the first power storage unit and the second power storage unit, the first and second relays are turned on to connect the positive electrodes of the first and second power storage units to each other and to connect the negative electrodes of the first and second power storage units to each other. This suppresses the occurrence of a difference between the voltage of the first power storage unit and the voltage of the second power storage unit.

SUMMARY

In recent years, there has been proposed a power supply device capable of switching between connecting a first power storage unit and a second power storage unit in series and connecting the first power storage unit and the second power storage unit in parallel. This power supply device includes a direct current charging device that includes a charging power line, a charging relay, a series connection line, a series connection relay, a parallel connection line, a parallel connection relay, a neutral point line, first and second neutral point relays, and a second capacitor. The charging power line connects between an external charging connector and a portion of a power line between a system main relay and an inverter. The charging relay is attached to the charging power line. The series connection line connects the first power storage unit and the second power storage unit in series. The series connection relay is attached to the series connection line. The parallel connection line connects between a portion of the series connection line on the first power storage unit side with respect to the series connection relay and a portion of the negative-side line of the power line on the second power storage unit side with respect to the negative side relay and the precharge relay. The parallel connection relay is attached to the parallel connection line. The neutral point line connects between a neutral point of a three-phase alternating current motor and a portion of the series connection line on the second power storage unit side with respect to the series connection relay. The first neutral point relay is attached to the neutral point line. The second neutral point relay is attached to a portion of the neutral point line on the second power storage unit side with respect to the first neutral point relay. The second capacitor is attached between a portion of the neutral point line between the first neutral point relay and the second neutral point relay and a portion of the negative-side line of the power line on the inverter side with respect to the negative-side relay. In this device, the first power storage unit and the second power storage unit are connected in parallel by turning on the positive-side relay of the system main relay, the charging relay, the parallel connection relay, and the first and second neutral point relays and turning off the negative-side relay and the precharge relay of the system main relay and the series connection relay. In the power supply device, if the voltage of the first power storage unit is more than the voltage of the second power storage unit before the first power storage unit and the second power storage unit are connected in parallel, a relatively large current flows from the second power storage unit to the first power storage unit via the diodes of the inverter and the motor when the first power storage unit and the second power storage unit are connected in parallel. Such a current may cause a defect in a wire that connects between the first power storage unit and the second power storage unit etc., and is desired to be suppressed.

A main object of the power supply device according to the present disclosure is to suppress a large current flowing from a second power storage unit to a first power storage unit.

In order to achieve the above main object, the power supply device according to the present disclosure adopts the following means.

An aspect of the present disclosure provides
a power supply device that supplies electric power to an inverter that includes a plurality of switching elements and diodes connected in parallel in an opposite direction to the respective switching elements and that drives a three-phase alternating current motor, including:
a power storage device that includes a first power storage unit and a second power storage unit;
a system main relay that includes a positive-side relay attached to a positive-side line of a power line that connects between the power storage device and the inverter, a negative-side relay attached to a negative-side line of the power line, and a precharge circuit in which a precharge resistor and a precharge relay are connected in series so as to bypass the negative-side relay;
a first capacitor attached to the power line;
a direct current charging device that includes a charging power line that connects between an external charging connector, to which external direct current power is supplied, and a portion of the power line between the system main relay and the inverter, a charging relay attached to the charging power line, a series connection line that connects the first power storage unit and the second power storage unit in series, a series connection relay attached to the series connection line, a parallel connection line that connects between a portion of the series connection line on the first power storage unit side with respect to the series connection relay and a portion of the negative-side line of the power line on the second power storage unit side with respect to the negative side relay and the precharge circuit, a parallel connection relay attached to the parallel connection line, a neutral point line that connects between a neutral point of the three-phase alternating current motor and a portion of the series connection line on the second power storage unit side with respect to the series connection relay, a first neutral point relay attached to the neutral point line, a second neutral point relay attached to a portion of the neutral point line on the second power storage unit side with respect to the first neutral point relay, and a second capacitor attached between a portion of the neutral point line between the first neutral point relay and the second neutral point relay and a portion of the negative-side line of the power line on the inverter side with respect to the negative-side relay and the precharge circuit, the direct current charging device charging the power storage device using the external direct current power; and a control device that executes one-side charging control for controlling the system main relay, the charging relay, the series connection relay, the parallel connection relay, the first neutral point relay, and the second neutral point relay such that only the first power storage unit is charged using the external direct current power until a voltage of the first power storage unit becomes equal to or more than a voltage of the second power storage unit before the first neutral point relay and the second neutral point relay are turned on to charge the power storage device using the external direct current power.

In the power supply device according to the present disclosure, one-side charging control is executed to control the system main relay, the charging relay, the series connection relay, the parallel connection relay, the first neutral point relay, and the second neutral point relay such that only the first power storage unit is charged using the external direct current power until a voltage of the first power storage unit becomes equal to or more than a voltage of the second power storage unit before the first neutral point relay and the second neutral point relay are turned on to charge the power storage device using the external direct current power. Accordingly, when the first and second neutral point relays are turned on after the one-side charging control is executed, application of a bias voltage in the forward direction to the diodes of the inverter is suppressed, and thus a flow of a large current from the second power storage unit through the diodes of the inverter and the motor is suppressed. As a result, it is possible to suppress a flow of a large current from the first power storage unit to the second power storage unit.

In the power supply device according to the present disclosure, the control device may compare the voltage of the first power storage unit and the voltage of the second power storage unit and execute the one-side charging control when the voltage of the first power storage unit is less than the voltage of the second power storage unit before the first neutral point relay and the second neutral point relay are turned on to charge the power storage device using the external direct current power.

In this manner, the one-side charging control can be executed after confirming that the voltage of the first power storage unit is less than the voltage of the second power storage unit, that is, that a bias voltage in the forward direction is applied to the diodes of the inverter when the first and second neutral point relays are turned on.

In the power supply device according to the present disclosure, the control device may execute the one-side charging control after controlling the system main relay, the charging relay, the series connection relay, the parallel connection relay, the first neutral point relay, and the second neutral point relay such that both the first capacitor and the second capacitor are precharged before the first neutral point relay and the second neutral point relay are turned on to charge the power storage device using the external direct current power.

In this manner, it is possible to suppress a flow of a large current from the second power storage unit to the first power storage unit more reliably after the first and second capacitors are precharged.

In the power supply device according to the present disclosure, the one-side charging control may be control in which the charging relay, the positive-side relay and the negative-side relay of the system main relay, the parallel connection relay, and the second neutral point relay are turned on and the precharge relay of the system main relay, the series connection relay, and the first neutral point relay are turned off.

In this manner, only the first power storage unit can be charged by turning on the charging relay, the positive-side relay and the negative-side relay of the system main relay, the parallel connection relay, and the second neutral point relay and turning off the precharge relay of the system main relay, the series connection relay, and the first neutral point relay.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
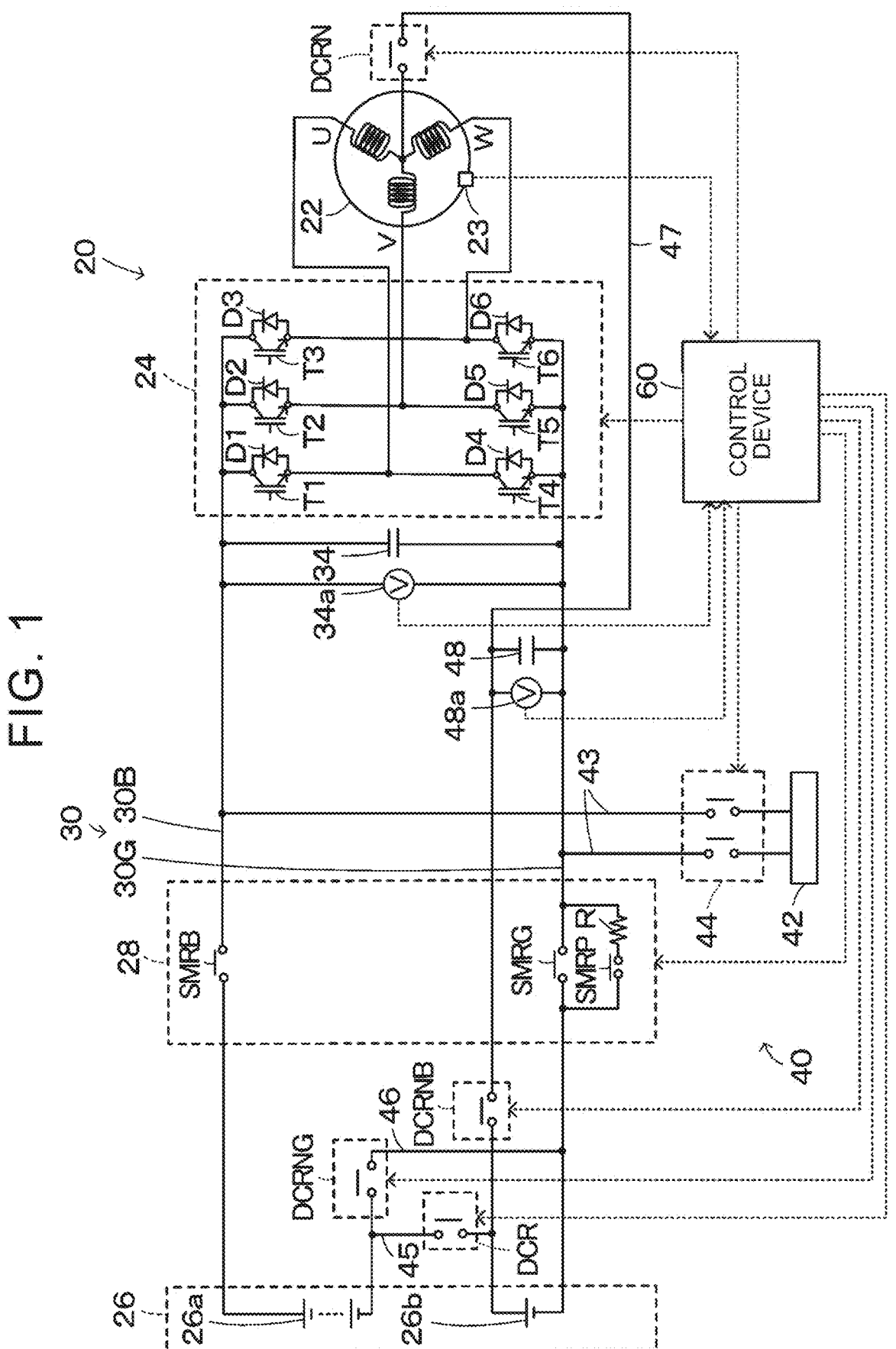
FIG. 1 is a configuration diagram illustrating an outline of a configuration of a power supply device according to the present embodiment.

Embodiments of the present disclosure will be described with reference to the drawings. FIG. 1 is a configuration diagram illustrating an outline of a configuration of a power supply device 20 according to the present embodiment. The power supply device 20 of the embodiment is configured as a device that supplies electric power to the inverter 24 that drives the motor 22. The power supply device 20 includes a battery 26 as a power storage device, a system main relay 28, a first capacitor 34, a DC charging device 40, and a control device 60.

The motor 22 is configured as a well-known three-phase AC motor including, for example, a rotor having a permanent magnet attached to an outer surface thereof and a stator in which a three-phase coil is wound. The inverter 24 includes six transistors T1 to T6 as switching elements and six diode D1 to D6 connected in parallel to the transistor T1 to T6 in opposite directions. The transistors T1 to T6 are arranged in pairs such that the inverters 24 are on the source-side and the sink-side with respect to the positive and negative buses shared by the power lines 30. In the transistor T1 to T6, each of the three-phase coils (U-phase, V-phase, and W-phase) of the motor 22 is connected to each of the connecting points of the pair of transistors. The inverter 24 forms a rotating magnetic field in the three-phase coil by controlling the ratio of the on-time of the pair of transistor T1 to T6 while a voltage is applied between the positive electrode bus and the negative electrode bus, thereby rotationally driving the motor 22. The smoothing first capacitor 34 is connected to the power line 30.

The battery 26 includes a first battery 26*a* serving as a first power storage unit and a second battery 26*b* serving as a second power storage unit having the same inter-terminal voltage as the first battery 26*a*, and is connected to the power line 30. The first battery 26*a* and the second battery 26*b* are configured as, for example, a lithium-ion secondary battery or a nickel-hydrogen secondary battery.

The system main relay 28 is connected to the power line 30. The system main relay 28 includes a positive-side relay SMRB, a negative-side relay SMRG, and a precharge circuit. The positive-electrode-side relay SMRB is attached to the positive-electrode-side line 30B of the power line 30. The negative-electrode-side relay SMRG is attached to the negative-electrode-side line 30G of the power line 30. In the precharge circuit, the precharge resistor R and the precharge relay SMRP are connected in series so as to bypass the negative-side relay SMRG.

The DC charging device 40 includes an external charging connector 42, a charging power line 43, a charging relay 44, a series connection line 45, a series connection relay DCR, a parallel connection line 46, a parallel connection relay DCRNG, a neutral point line 47, first and second neutral point relays DCRN, DCRNB, and a second capacitor 48. The external charging connector 42 is connected to an external DC power source, and DC power (external DC power) is supplied from the outside. The charging power line 43 is connected to the external charging connector 42 and is connected between the system main relay 28 of the power line 30 and the inverter 24. The charging relay 44 is attached to the charging power line 43. The series connection line 45 connects the first battery 26*a* and the second battery 26*b* in series. The series connection relay DCR is attached to the series connection line 45. The parallel connection line 46 connects the first battery 26*a* side from the series connection relay DCR of the series connection line 45 and the second battery 26*b* side from the negative electrode side relay SMRG and the precharge circuit of the negative-electrode-side line 30G of the power line 30. The parallel connection relay DCRNG is attached to the parallel connection line 46. The neutral point line 47 connects the neutral point of the motor 22 to the second battery 26*b* from the series connection relay DCR of the series connection line 45. The first neutral point relay DCRN is attached to the neutral point line 47. The second neutral point relay DCRNB is mounted closer to the second battery 26*b* than the first neutral point relay DCRN of the neutral point line 47. The second capacitor 48 is mounted between the first neutral point relay DCRN and the second neutral point relay DCRNB of the neutral point line 47, and on the negative-side relay SMRG of the negative-electrode-side line 30G of the power line 30 and on the inverter 24 side of the precharge circuit.

Although not shown, the control device 60 is configured as a microprocessor centered on a CPU, and includes, in addition to CPU, a ROM for storing a process program, a RAM, flash memory for temporarily storing data, an input/output port, a communication port, and the like. A signal from various sensors is input to the control device 60 via an input port. Examples of the signal inputted to the control device 60 include a rotational position θm from a rotational position detection sensor (for example, a resolver) 23 that detects the rotational position of the rotor of the motor 22, a phase current flowing in a three-phase coil (U-phase, V-phase, and W-phase) of the motor 22, a voltage VH from a voltage sensor 34*a* that detects the voltage of the first capacitor 34, and a voltage VL from a voltage sensor 48*a* that detects the voltage of the second capacitor 48. The control device 60 is also connected to a communication line for communicating with an external power source via the external charging connector 42.

Various control signals are output from the control device 60 via an output port. Examples of the signal outputted from the control device 60 include a switching control signal to the transistor T1 to T6 of the inverter 24, a drive control signal to the system main relay 28, a drive control signal to the charging relay 44, a drive control signal to the series connection relay DCR, a drive control signal to the parallel connection relay DCRNG, a drive control signal to the first neutral point relay DCRN, a drive control signal to the second neutral point relay DCRNB, and the like.

Figure 2:
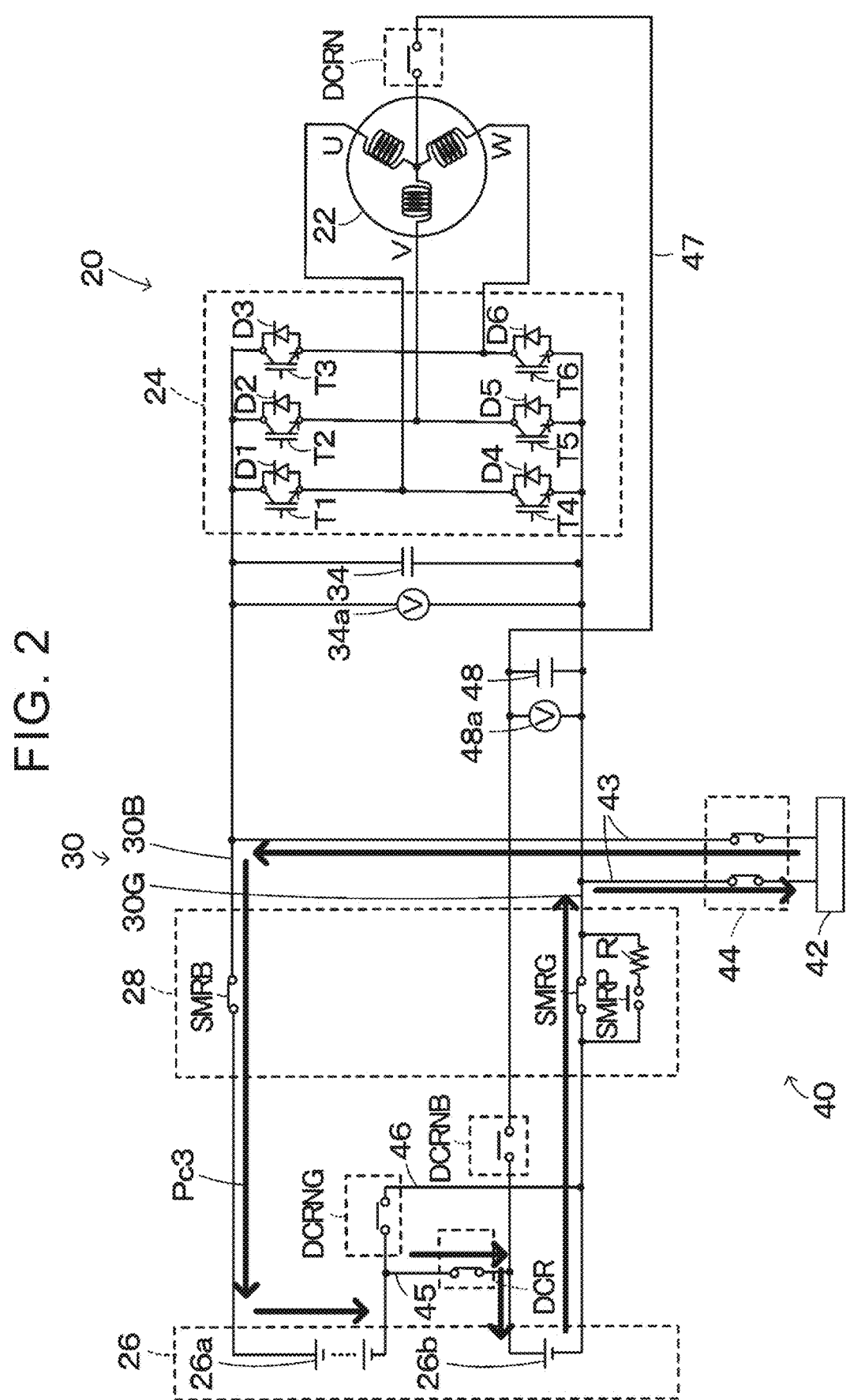
FIG. 2 is an explanatory diagram for explaining an on-off state of each relay in the first charging.
Figure 3:
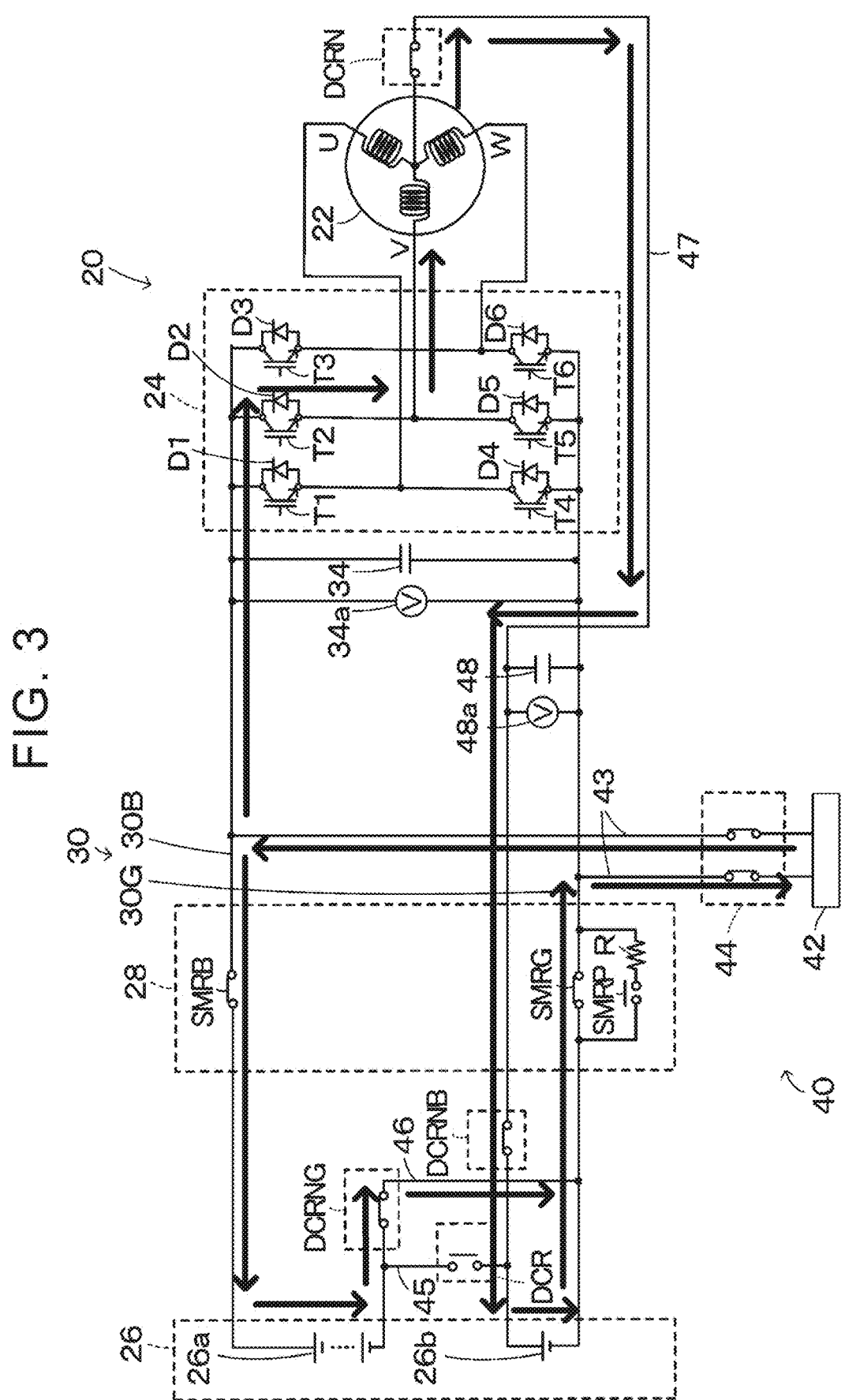
FIG. 3 is an explanatory diagram for explaining an on-off state of each relay in the second charging.

When an external power source is connected to the external charging connector 42 of the DC charging device 40, the control device 60 receives the voltage Vd (external DC voltage Vd) of the DC power supplied by the external power source. The control device 60 charges the battery 26 by the first charging by the DC charging device 40 when the external DC voltage Vd is the rated voltage V1 of the battery 26 when the first battery 26*a* and the second battery 26*b* are connected in series, and charges the battery 26 by the second charging by the DC charging device 40 when the external DC voltage Vd is 0.5 times the rated voltage V1. FIG. 2 is an explanatory diagram for explaining the on-off status of the relays in the first charge. In the figure, the thick line indicates the path of the current. In the first charging, the control device 60 turns on the positive-side relay SMRB, the negative-side relay SMRG, the charging relay 44, and the series connection relay DCR of the system main relay 28, and turns off the parallel connection relay DCRNG, the precharge relay SMRP of the system main relay 28, and the first and second neutral point relays DCRN, DCRNB, as shown in FIG. 2. Therefore, in the first charging, the battery 26 is charged using the charging power line 43, the power line 30, and the series connection line 45 while the first battery 26*a* and the second battery 26*b* are connected in series. FIG. 3 is an explanatory diagram for explaining the ON/OFF status of the relays in the second charge. In the figure, the thick line indicates the path of the current. In the second charging, the control device 60 turns on the positive-side relay SMRB, the negative-side relay SMRG, the charging relay 44, the parallel connection relay DCRNG, and the first and second neutral point relays DCRN, DCRNB of the system main relay 28, and turns off the precharge relay SMRP of the system main relay 28 and the series connection relay DCR. Therefore, in the second charge, the first battery 26*a* and the second battery 26*b* are connected in parallel. The first battery 26*a* is charged by a current path that returns from the positive-side line of the charging power line 43 to the negative-side line of the charging power line 43 via the positive-electrode-side line 30B of the power line 30, the first battery 26a, the parallel connection line 46, and the negative-electrode-side line 30G of the power line 30. The second battery 26b is charged by a current path that returns from the positive-side line of the charging power line 43 to the negative-side line of the charging power line 43 via any of the positive-electrode-side line 30B of the power line 30 and D1 to D3 of the inverters 24, the motor 22, the neutral point line 47, the second battery 26b, and the negative-electrode-side line 30G of the power line 30.

Figure 4:
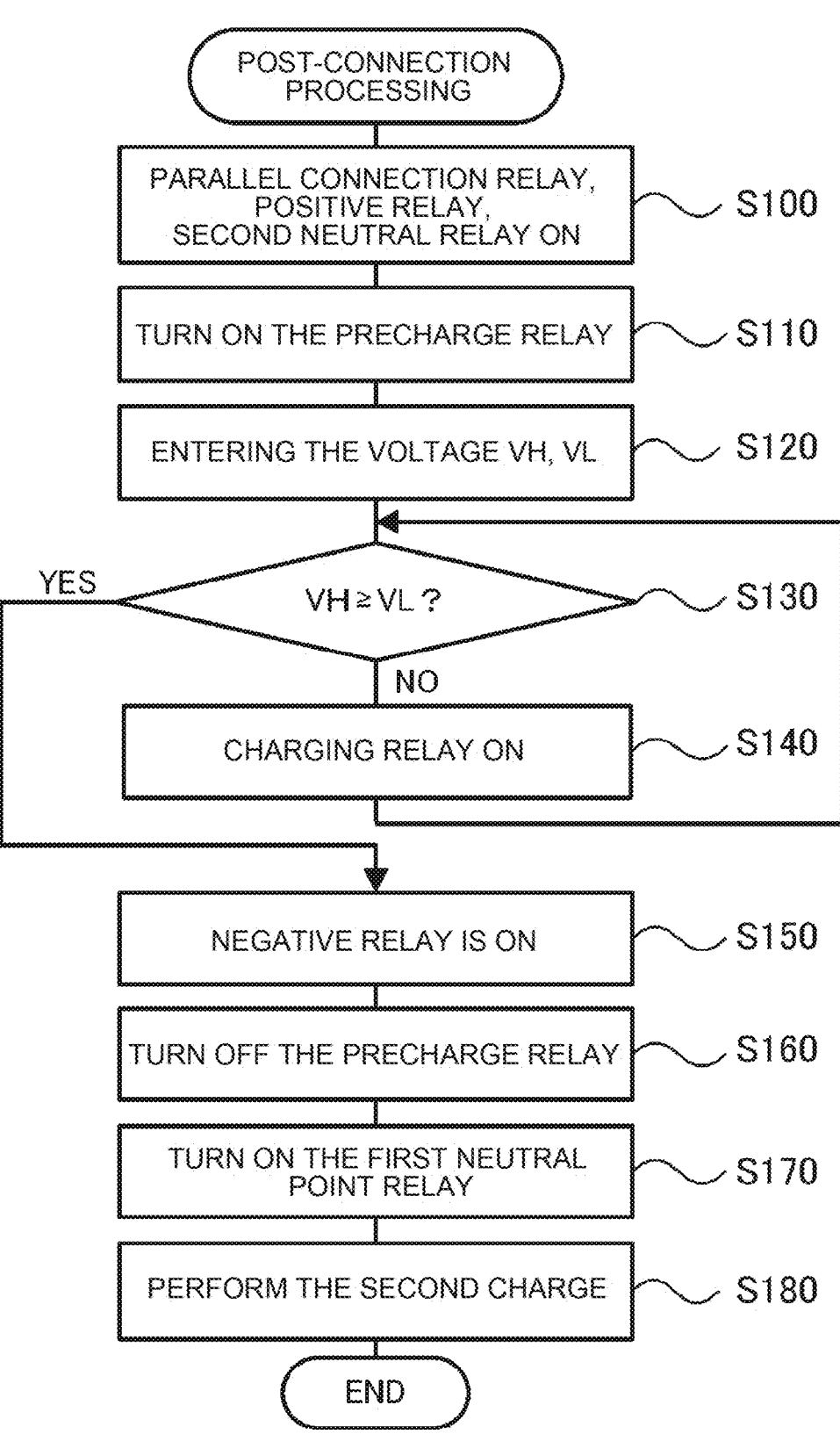
FIG. 4 is a flowchart illustrating an example of a post-connection processing routine executed by the control device.

Next, the operation of the power supply device 20 configured in this way, in particular, the operation before performing the second charging of the battery 26 will be described. FIG. 4 is a flow chart illustrating an exemplary post-connection routine executed by the control device 60. When an external power source is connected to the external charging connector 42, the control device 60 has an external DC voltage Vd equal to 0.0 of the rated voltage V1. This routine is executed when it is 5 times. Before this routine is executed, the system main relay 28, the charging relay 44, the series connection relay DCR, the parallel connection relay DCRNG, and the first and second neutral point relays DCRN, DCRNB are all turned off.

Figure 5:
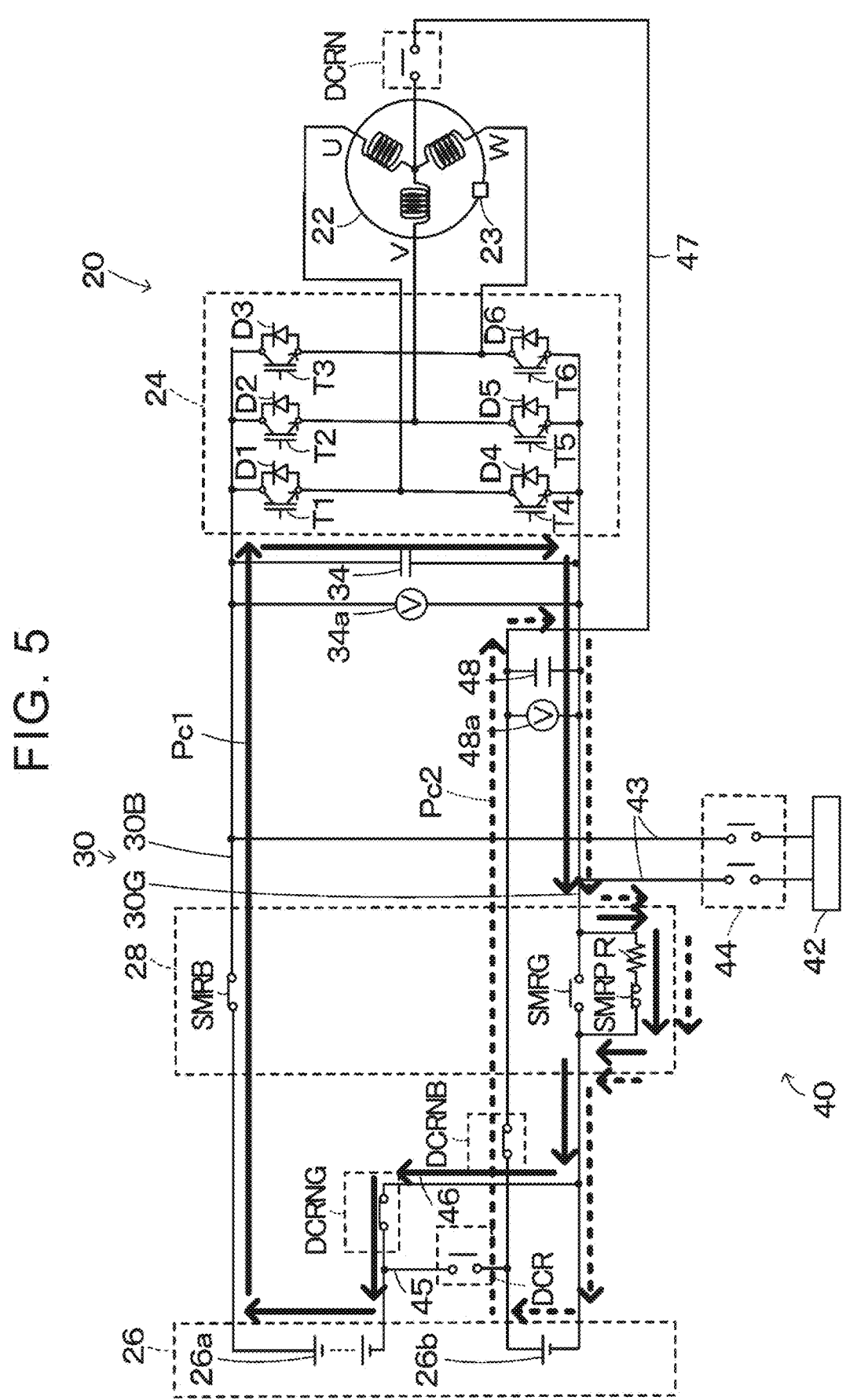
FIG. 5 is an explanatory diagram for explaining a current path in the power supply device when S110 is executed.

When this routine is executed, the control device 60 turns on the parallel connection relay DCRNG, the positive-side relay SMRB of the system main relay 28, and the second neutral point relay DCRNB (S100). Next, the control device 60 turns on the precharge relay SMRP of the system main relay 28 (S110). FIG. 5 is an explanatory diagram for explaining a current path in the power supply device 20 when S110 is executed. In the figure, a thick solid line indicates an outline of the first current path Pc1. The bold dashed line shows the outline of the second current path Pc2. When the parallel connection relay DCRNG, the positive-side relay SMRB of the system main relay 28, the second neutral point relay DCRNB, and the precharge relay SMRP of the system main relay 28 are turned on, the first current path Pc1 and the second current path Pc2 are formed as shown in the figure. The first current path Pc1 is a path from the first battery 26a to the first battery 26a via the positive-electrode-side line 30B of the power line 30, the first capacitor 34, the negative-electrode-side line 30G of the power line 30, and the parallel connection line 46. The first capacitor 34 is precharged (charged) with a current flowing through the first current path Pc1, and the voltage VH increases. The second current path Pc2 is a path from the second battery 26b to the second battery 26b via the neutral point line 47, the second capacitor 48, and the negative-electrode-side line 30G of the power line 30. The second capacitor 48 is precharged (charged) with the current flowing through the second current path Pc2 to increase the voltage VL.

Subsequently, the control device 60 receives the voltage VH from the voltage sensor 34a and the voltage VL from the voltage sensor 48a (S120). Then, the control device 60 determines whether or not the voltage VH is equal to or greater than the voltage VL (S130). When the voltage VH is equal to or higher than the voltage VL, the negative-side relay SMRG of the system main relay 28 is turned on (S150), the precharge relay SMRP of the system main relay 28 is turned off (S160), and the first neutral point relay DCRN is turned on (S170). Then, the control device 60 performs the second charge (S180), and ends the routine.

Figure 6:
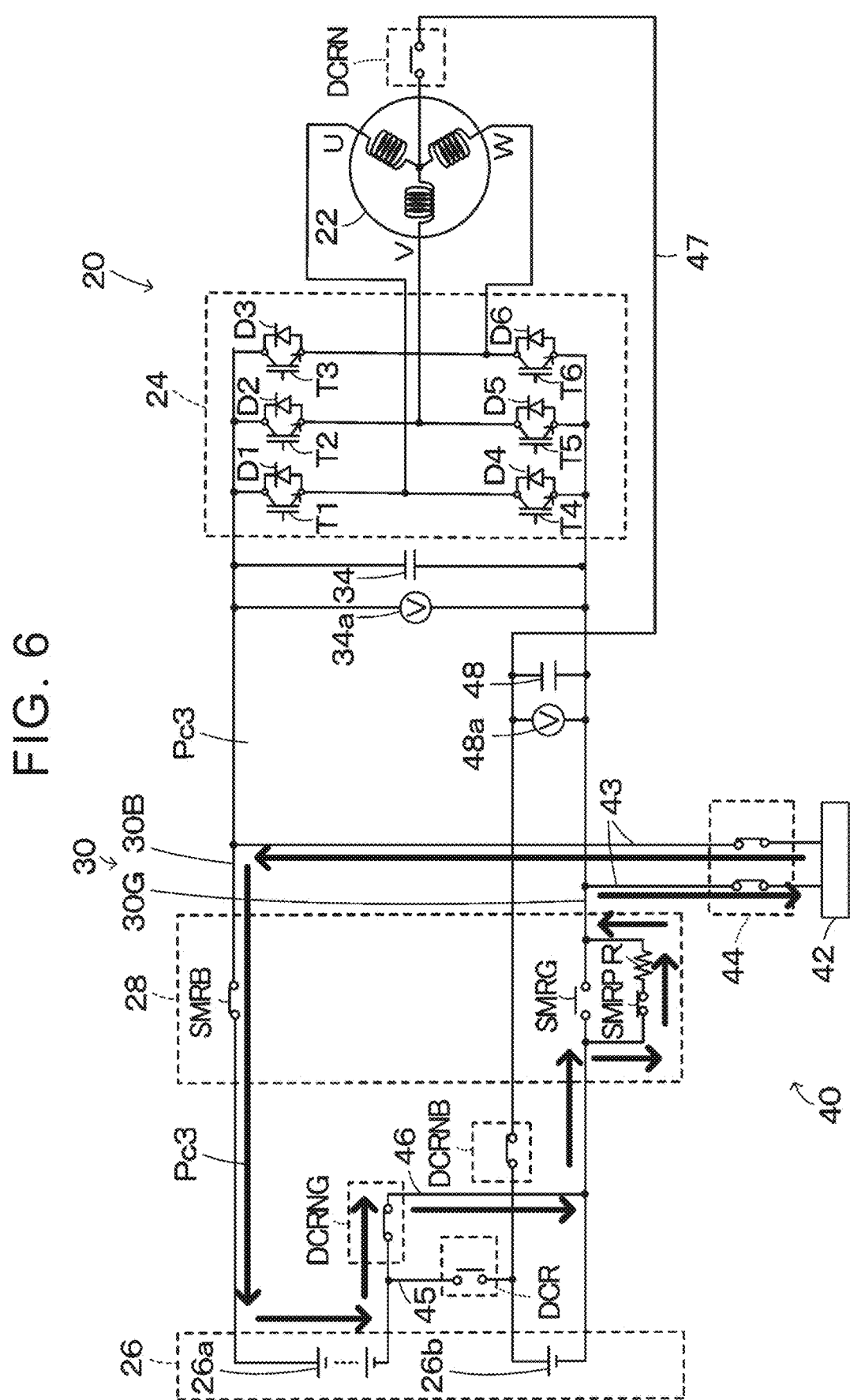
FIG. 6 is an explanatory diagram for explaining a current path in the power supply device when S140 is executed.

When the voltage VH is less than the voltage VL in S130, the charge-use relay 44 is turned on (S140). FIG. 6 is an explanatory diagram for explaining a current path in the power supply device 20 when S140 is executed. In the figure, a thick solid line indicates an outline of the third current path Pc3. When the charging relay 44 is turned on while the parallel connection relay DCRNG, the positive-side relay SMRB of the system main relay 28, the second neutral point relay DCRNB, and the precharge relay SMRP of the system main relay 28 are turned on, the third current path Pc3 is formed as shown in the figure. The third current path Pc3 is a current path that returns from the positive-side line of the charging power line 43 to the negative-side line of the charging power line 43 via the positive-electrode-side line 30B of the power line 30, the first battery 26a, the parallel connection line 46, and the negative-electrode-side line 30G of the power line 30. By forming the third current path Pc3 in this way, it is possible to perform one-side charging in which only the first battery 26a is charged, and thus to increase the voltage VH.

When the charging relay 44 is turned on in this way, S130 waits until the voltage VH becomes equal to or higher than the voltage VL (S130, S140). When the voltage VH becomes equal to or higher than the voltage VL, the negative-side relay SMRG of the system main relay 28 is turned on (S150), the precharge relay SMRP of the system main relay 28 is turned off (S160), and the first neutral point relay DCRN is turned on (S170). Then, the control device 60 performs the second charge (S180), and ends the routine. Thus, by executing the one-side charging control for controlling the system main relay 28, the charging relay 44, the series connection relay DCR, the parallel connection relay DCRNG, and the first and second neutral point relays DCRN, DCRNB so that only the first battery 26a is charged using the external DC power until the voltage VH of the first battery 26a becomes equal to or higher than the voltage VL of the second battery 26b prior to charging the battery 26 using the external DC power by turning on the first and second neutral point relay DCRN, DCRNB, the forward bias voltage is suppressed from being applied to the diode D1 to D3 of the inverter 24. Accordingly, it is possible to suppress a large current from flowing from the second battery 26b to the first battery 26a.

According to the power supply device 20 of the present disclosure described above, it is possible to suppress a large current from flowing from the second battery 26b to the first battery 26a by executing the one-side charging control for controlling the system main relay 28, the charging relay 44, the series connection relay DCR, the parallel connection relay DCRNG, and the first and second neutral point relays DCRN, DCRNB so that only the first battery 26a is charged using the external direct current power until the voltage VH of the first battery 26a becomes equal to or higher than the voltage VL of the second battery 26b, when the voltage VH of the first battery 26a and the voltage VL of the second battery 26b are compared with each other before the battery 26 is charged using the external direct current power by turning on the first and second neutral point relays DCRN, DCRNB, and the voltage VH of the first battery 26a is less than the voltage VL of the second battery 26b. Further it is possible to execute the one-side charging control after confirming that the voltage VH of the first battery 26a is less than the voltage VL of the second battery 26b, that is, a biasing voltage is applied forward to the diode D1 to D3 included in the inverter 24 when the first and the second neutral point relays DCRN, DCRNB are turned on.

Further, in the power supply device 20 of the present disclosure, by executing the one-side charging control after the system main relay 28, the charging relay 44, the series connection relay DCR, the parallel connection relay DCRNG, and the first and second neutral point relay DCRN, DCRNB are controlled so that the first and second capacitors 34 and 48 are both precharged, prior to the charging of the battery 26 using the external DC power by turning on the first and second neutral point relay DCRN, DCRNB, it is possible to suppress the large current from flowing from the second battery 26b to the first battery 26a more reliably after the first and second capacitors 34 and 48 are both precharged.

Then, in the power supply device 20 of the present disclosure, the one-side charge control turns on the charge relay 44, the positive-side relay SMRB and the negative-side relay SMRG of the system main relay 28, the parallel connection relay DCRNG, and the second neutral point relay DCRNB, and turns off the precharge relay SMRP of the system main relay 28, the series connection relay DCR, and the first neutral point relay DCRN, whereby only the first battery 26a can be charged.

In the above-described embodiment, prior to the charging of the battery 26 using the external DC power by turning on the first and second neutral point relay DCRN, DCRNB, the voltage VH of the first battery 26a is compared with the voltage VL of the second battery 26b, and the one-side charging control is performed when the voltage VH of the first battery 26a is less than the voltage VL of the second battery 26b. However, without comparing the voltage VH of the first battery 26a and the voltage VL of the second battery 26b, one-side charge control for controlling the system main relay 28, the charging relay 44, the series connection relay DCR, the parallel connection relay DCRNG, and the first and second neutral point relays DCRN, DCRNB may be executed so that only the first battery 26a is charged by using the external DC power until the voltage VH of the first battery 26a becomes equal to or higher than the voltage VL of the second battery 26b.

In the above-described embodiment, prior to charging the battery 26 using the external DC power by turning on the first and second neutral point relay DCRN, DCRNB, the system main relay 28, the charging relay 44 and the series connection relay DCR and the parallel connection relay DCRNG and the first and second neutral point relay DCRN, DCRNB are controlled so that the first and second capacitors 34 and 48 are both precharged, and then the one-side charging control is executed. However, the one-side charge control may be executed without precharging the first and second capacitors 34 and 48.

In the above-described embodiment, the power supply device 20 includes the battery 26 having the first battery 26a and the second battery 26b, but at least one of the first battery 26a and the second battery 26b may be a capacitor.

The correspondence between the main elements of the embodiments and the main elements of the disclosure described in the column of the means for solving the problem will be described. In the embodiment, the first battery 26a functions as a "first power storage unit", the second battery 26b functions as a "second power storage unit", the battery 26 functions as a "power storage device", the positive electrode side relay SMRB functions as a "positive electrode side relay", the negative electrode side relay SMRG functions as a "negative electrode side relay", the precharge resistor R functions as a "precharge resistor", the precharge relay SMRP functions as a "precharge relay", the system main relay 28 functions as a "system main relay", the first capacitor 34 functions as a "first capacitor", and the charging power line 43 functions as a "charging power line", the charging relay 44 functions as a "charging relay", the series connection line 45 functions as a "series connection line", the series connection relay DCR functions as a "series connection relay", the parallel connection line 46 functions as a "parallel connection line", the parallel connection relay DCRNG functions as a "parallel connection relay", the neutral point line 47 functions as a "neutral point line", the first neutral point relay DCRN functions as a "first neutral point relay", the second neutral point relay DCRNB functions as a "second neutral point relay", the second capacitor 48 functions as a "second capacitor", the DC charging device 40 functions as a "direct current charging device", and the control device 60 functions as a "control device".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a power supply device and the like.

What is claimed is:

1. A power supply device configured to supply electric power to an inverter that includes a plurality of switching elements and a plurality of diodes connected in parallel in an opposite direction to the respective switching elements and that drives a three-phase alternating current motor, the power supply device comprising:

a power storage device that includes a first power storage unit and a second power storage unit;

a system main relay that includes a positive-side relay attached to a positive-side line of a power line that connects between the power storage device and the inverter, a negative-side relay attached to a negative-side line of the power line, and a precharge circuit in parallel with the negative-side relay, the precharge circuit including a precharge resistor connected in series with a precharge relay;

a first capacitor attached to the power line;

a direct current charging device that includes a charging power line that connects between an external charging connector, to which external direct current power is supplied, and a portion of the power line between the system main relay and the inverter, a charging relay attached to the charging power line, a series connection line that connects the first power storage unit and the second power storage unit in series, a series connection relay attached to the series connection line, a parallel connection line that connects between a portion of the series connection line on the first power storage unit side with respect to the series connection relay and a portion of the negative-side line of the power line on the second power storage unit side with respect to the negative-side relay and the precharge circuit, a parallel connection relay attached to the parallel connection line, a neutral point line that connects between a neutral point of the three-phase alternating current motor and a portion of the series connection line on the second power storage unit side with respect to the series connection relay, a first neutral point relay attached to the neutral point line, a second neutral point relay attached to a portion of the neutral point line on the second power storage unit side with respect to the first neutral point relay, and a second capacitor attached between a portion of the neutral point line between the first neutral point relay and the second neutral point relay and a portion of the negative-side line of the power line on the inverter side with respect to the negative-side relay and the precharge circuit;

a first voltage sensor configured to detect a first voltage value of the first capacitor;

a second voltage sensor configured to detect a second voltage value of the second capacitor; and a processor configured to execute following processes in the order of (i) to (viii) to charge the power storage device using the external direct current power:

(i) turning off the system main relay, the charging relay, the series connection relay, the parallel connection relay, the first neutral point relay, and the second neutral point relay, (ii) turning on the parallel connection relay, the positive-side relay, and the second neutral point relay, (iii) turning on the precharge relay, (iv) acquiring the detected first voltage value from the first voltage sensor and the detected second voltage value from the second voltage sensor, (v) comparing the detected first voltage value and the detected second voltage value, (vi) turning on the charging relay in a case where the detected first voltage value is less than the detected second voltage value, (vii) repeating the processes (iv) and (v), and (viii) turning on the negative-side relay and the first neutral point relay and turning off the precharge relay in a case where the detected first voltage value is equal to or higher than the detected second voltage value.

2. The power supply device according to claim 1, wherein the processor is further configured to turn on the charging relay, compare an external voltage value of the external direct current power and a rated voltage value of the first power storage unit in combination with the second power storage unit in series, and execute the processes (i) to (viii) in a case where the external voltage value is 0.5 times the rated voltage value.

* * * * *